July 1, 1958    J. R. CORBETT    2,841,723
MOTOR UNIT FOR CULINARY APPLIANCES
Filed Feb. 10, 1954    2 Sheets-Sheet 1

INVENTORS
Joseph R. Corbett
Lindol H. Sprague
BY Wood, Herron & Evans
ATTORNEYS.

July 1, 1958     J. R. CORBETT     2,841,723
MOTOR UNIT FOR CULINARY APPLIANCES

Filed Feb. 10, 1954     2 Sheets-Sheet 2

INVENTORS
Joseph R. Corbett
BY Hindol H. Sprague
Wood, Herron & Evans
ATTORNEYS.

2,841,723
Patented July 1, 1958

2,841,723

MOTOR UNIT FOR CULINARY APPLIANCES

Joseph R. Corbett and Lindol H. Sprague, Cincinnati, Ohio; said Sprague assignor to said Corbett Application February 10, 1954, Serial No. 409,372

1 Claim. (Cl. 310—50)

This invention relates to electrically driven culinary appliances which are employed in kitchens for mixing, beating, liquifying and otherwise preparing foods and beverages.

Specifically the present invention is directed to an improved housing construction for an electric motor which is adapted to be utilized as the basic unit in a plurality of different motor-appliance combinations.

The unit of this invention comprises an electric motor housing that is generally triangular in cross section. Both ends of the housing are squared off to provide flat faces. Power take-off means are provided at both ends of the housing in centrally located recesses, one being a slow speed drive and the other being a high speed drive. Due to the shape of the housing, the motor unit may be used in any one of three positions. It may be placed on its side to expose both of the power take-off means; it may be stood up on one end to expose the high speed power take-off means; or it may be stood up on the opposite end to expose the slow speed take-off means.

In the first position, the slow speed take-off may be used for driving a beater of the type which is adapted to be held in the hand, a flexible shaft being used to transmit the motor's torque to the beater blades. The high speed take-off may also be used to drive other appliances.

When the unit is stood up on end it may be used as the base and power means for additional appliances. For example, with the high speed end up, the unit is adapted to support and drive a blender for mixing beverages and for liquifying foods. By standing the unit on the other end to expose the slow speed drive, it may be used to support and drive a mixer. A preferred form of mixer for use in combination with the unit in this way is disclosed in our copending patent application Serial No. 409,371 filed February 10, 1954, now Patent No. 2,798,700.

Preferably, a plurality of resilient pads are secured to one of the three side faces of the triangular shaped housing to support the unit when it is in the first position. These pads provide a firm foundation for the unit and serve to absorb the vibrations of the motor. Additional resilient pads may be provided on the two ends of the housing for the same purposes.

The longitudinal side edge of the housing which is opposite to the face upon which the pads are located is configurated to provide a handle. When the unit is resting upon its side, the handle is up and therefore conveniently located to facilitate the moving of the unit from place to place. Preferably, means are provided at the outside of the housing to control the speed of the motor. In the preferred embodiment this is done by means of a knob disposed on one of the two side faces of the housing which is adjacent to the handle. Thus placed, the knob is readily visible at all times and does not interfere with the unit in any of its three positions.

It is believed that other uses for the present unit will be readily apparent to those skilled in the art from the following detailed description of the drawings which disclose a preferred embodiment of the invention.

In this disclosure only the outside of the motor unit is shown in detail inasmuch as it is believed to be within the expected knowledge of those skilled in the art to determine the specific type of electric motor and the type of gearing best suited for particular sets of appliances. In addition, the power take-off speeds and the power take-off couplers best suited for particular sets of appliances will be apparent to those skilled in the art.

There are disclosures in the prior art of power units which incorporate both high and low speed take-offs at the opposite ends of an electric motor. The present invention is concerned primarily with an improved housing construction for such a unit which adapts it for use as the basic unit in a plurality of motor-appliance combinations.

Figure 2:
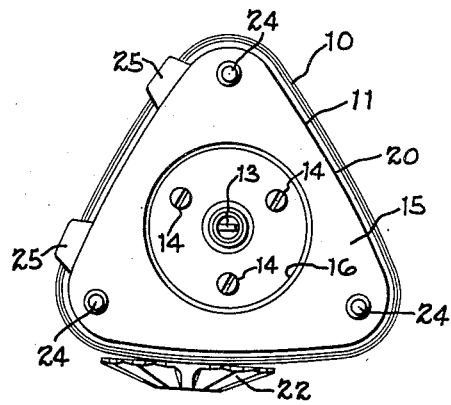
Figure 2 is a top plan view of the unit as it is shown in Figure 1.
Figure 3:
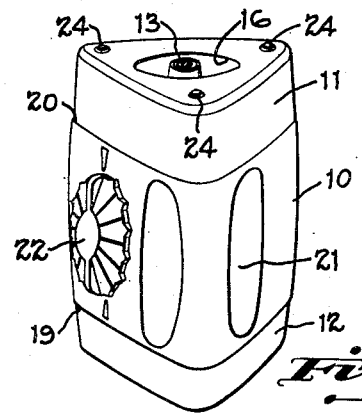
Figure 3 is a perspective view of the handle side of the unit.
Figure 4:
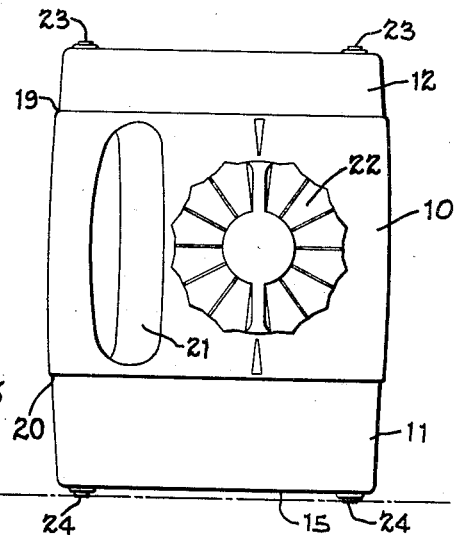
Figure 4 shows the unit, in side elevation, resting on the end opposite to the one illustrated in Figure 1 to expose the high speed take-off end.

The housing of the unit consists of a motor casing 10 which may be a casting of light metal such as aluminum and two end bells 11 and 12 which also may be cast from a metal such as aluminum. End bell 11, it will be observed, is substantially thicker in a direction longitudinally of the unit than end bell 12. This is so that end bell 11 may house a gear reduction transmission for connecting the drive shaft of the motor to a slow speed take-off indicated at 13. The type of coupling provided at the slow speed take-off is not critical, the one shown in Figure 2 being designed to be used to drive the mixer which is disclosed in my copending application referred to above. The power take-off 13 is recessed with respect to the flat outer face 15 of end bell 11 so that the motor unit may be stood upright on this end, as shown in Figure 4. In the instance shown a circular recess 16 is provided, the recess preferably being formed at the time the end bell is cast.

With the exception that end bell 12 is less thick than end bell 11, the two are substantially identical. A circular recess 17 is provided in end bell 12, this recess accommodating a resilient coupler 18 which is the high speed take-off element.

The three outer parts of the motor unit, the casing 10 and two end bells 11 and 12 may be secured together by tie bolts in a well known manner. The assembled unit is generally triangular in cross section. It is preferred, however, that the three side faces be slightly convex for the sake of appearance. Each one of the three corners is rounded on a substantial radius for the same reason. It is preferred that the unit, as viewed from any one of the sides, be slightly barrel-shaped, also for the sake of appearance. In addition, as will be seen from Figure 1, it is preferred that the casing 10 of the motor be slightly larger in girth than the end bells so as to provide two shoulders indicated at 19 and 20 where the two ends of the casing meet the end bells. In the instance shown, both shoulders are rounded.

One of the three side edges of the housing has an elongated slot 21 formed in it to provide a handle by means of which the unit may be grasped. Preferably, the slot extends substantially the full length of the casing portion of the unit. A speed control knob 22 is mounted on one of the two side faces of the unit adjacent to the handle. In this position the knob is readily accessible regardless of the operating position of the unit. It is believed to be within the knowledge of the skilled-in-the-art to provide the necessary electrical means operable upon the turning of the knob to control the motor's speed.

Figure 1:
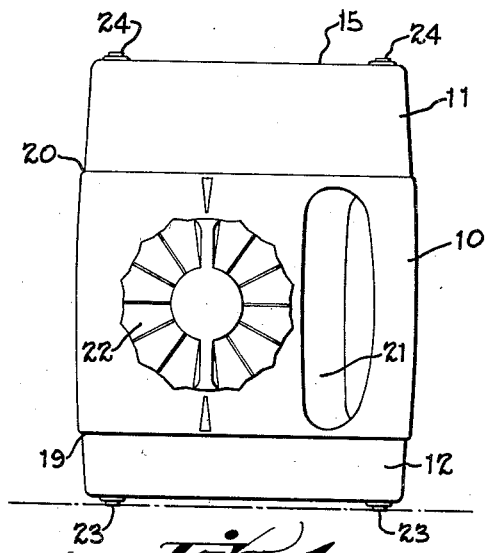
Figure 1 is a side elevational view of a motor unit incorporating the principles of the present invention, in which the unit is shown standing on one end with the slow speed take-off means exposed.
Figure 6:
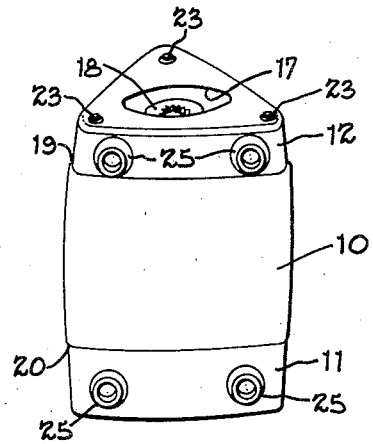
Figure 6 is a perspective view of the unit, illustrating in particular the pads which are provided to support the unit when it is on its side.
Figure 7:
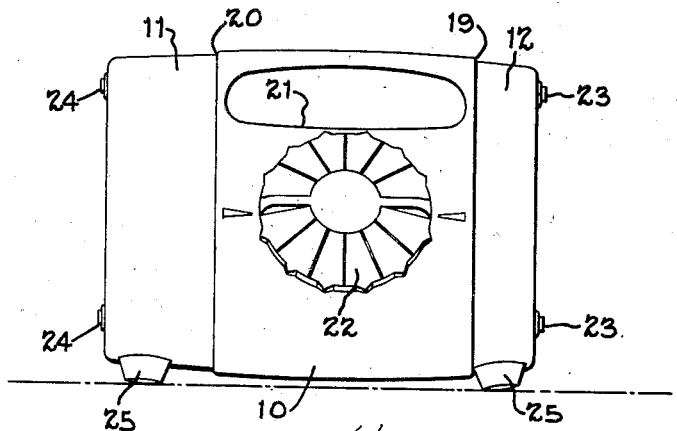
Figure 7 is a side elevational view showing the unit resting on its side to expose both the slow and high speed drive take-offs.

There are three operating positions for the unit. As shown in Figure 1, the unit may be stood up on end bell 12 to expose the slow speed coupling. For this purpose three resilient pads 23 are provided on the flat face of end bell 12 adjacent to the three corners thereof. In the second position shown in Figure 4, the unit is turned end for end so that it rests on end bell 11 with the high speed coupling 18 exposed. Three pads, such as those indicated at 24, are provided on the flat face of end bell 11, these pads being similar to pads 23. In the third position, the unit rests on the side which is opposite to the handle. This position is shown in Figure 7, and it exposes both of the power take-offs. Four resilient pads, such as those indicated at 25 are provided on the side of the unit. These pads may be secured in pairs to the respective end bells as shown in Figure 6.

By reference to our copending application Serial No. 409,371, now Patent Number 2,798,700, it is believed that it will be clear to those skilled in the art how the electric motor unit disclosed here may be used as the basic unit of a number of different motor-appliance combinations other than the specific ones suggested here.

Figure 8:
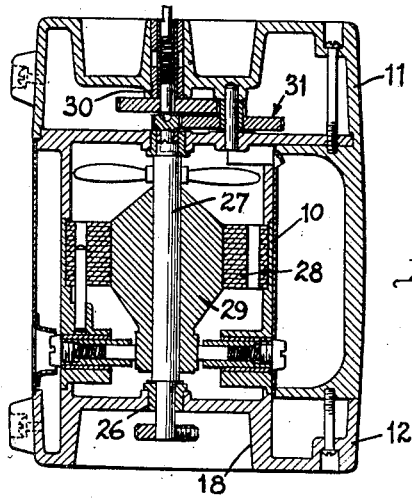
Figure 8 is a transverse cross-sectional view of the motor unit.
Figure 5:
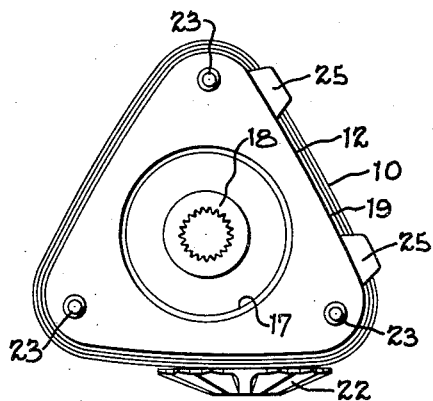
Figure 5 is a top plan view of the unit as it is shown in Figure 4.

The cross-sectional view of Figure 8 shows the high speed power take-off 18 which is journaled in end bell 12 in a bearing 26. It is seen that the high speed power take-off is coupled directly to the motor shaft 27. It also may be seen that the outer end of the high speed power take-off does not extend beyond the outer face 15 of end bell 11. The motor includes a stator 28 which is fastened to the inner wall of the motor casing 10. The rotor of the motor is designated 29. As shown, end bell 12 may comprise a casting which may be fastened to the motor housing, following conventional methods, by means of through bolts. The opposite end, designated 11, may be fastened to the motor housing in the same fashion and it may also be made as a casting to provide the recess 17 in which the low speed power take-off coupler 13 is located. In this case, the low speed power take-off coupler is journaled in a bearing 30 and it is interconnected to the motor shaft 27 by a speed reducing train of gears designated generally 31. The cross-sectional view of Figure 8 also shows that the two couplers are aligned axially of the motor unit in alignment with the motor shaft. For other details of the construction of the motor, reference is made to United States Patent Number 2,798,700.

Having described our invention we claim:

A housing for an electric motor adapted to be used as a source of power to drive culinary appliances, said housing comprising a casing, a pair of end bells secured respectively to the opposite ends of said casing, said casing and end bells being substantially triangular as viewed from an end to provide three side faces of substantially the same size, each of said end bells having an outer face which is flat and which is in a plane normal to the central axis of the housing, a recess centered in each of the outer faces of the end bells, a high speed power take-off coupler disposed within one of said recesses in a position to be accessible to a mating coupler of a culinary appliance, a low speed power take-off coupler disposed within the other recess in a position to be accessible to a mating coupler of a culinary appliance, an elongated slot extending through the housing adjacent to one of the three longitudinal side edges thereof to provide a handle by means of which the housing may be grasped, and a control knob for adjusting the speed of the motor mounted upon one of the faces of the housing adjacent to the handle, whereby said housing may be stood on one end bell to expose the high speed power take-off, or the housing may be stood on the other end bell to expose the low speed power take-off, or the housing may be laid down upon the face opposite to the handle to expose both power take-offs and in all three of said positions the control knob is readily accessible for manipulation thereof.

References Cited in the file of this patent

UNITED STATES PATENTS

| D. 172,127 | Corbett | May 11, 1954 |

FOREIGN PATENTS

| 544,672 | Great Britain | Apr. 23, 1942 |
| 645,701 | Germany | June 2, 1937 |